United States Patent
Vecchio et al.

[15] 3,679,767

[45] July 25, 1972

[54] PROCESS FOR PREPARING HALOGENATED AND MIXED HALOGENATED DERIVATIVES OF METHANE BY THE CHLOROFLUORINATION OF METHANE

[72] Inventors: Martino Vecchio, Milan; Italo Cammarata, Bollate; Vittorio Fattore, Milan, all of Italy

[73] Assignee: Montecatini Edison S.p.A., Milan, Italy

[22] Filed: Aug. 8, 1968

[21] Appl. No.: 751,056

Related U.S. Application Data

[63] Continuation-in-part of Ser. No. 608,705, Jan. 11, 1967, abandoned, which is a continuation-in-part of Ser. No. 458,413, May 24, 1965, abandoned.

[30] Foreign Application Priority Data

May 29, 1964  Italy...................................11912 A/64

[52] U.S. Cl........................................................260/653.8
[51] Int. Cl..........................................................C07c 17/10
[58] Field of Search............................260/653.8, 653.7, 664

[56] References Cited

UNITED STATES PATENTS

| | | | |
|---|---|---|---|
| 3,442,962 | 5/1969 | Vecchio et al. | 260/653.7 |
| 3,372,126 | 3/1968 | Vecchio et al. | 260/653 |
| 2,639,300 | 5/1953 | Ruh et al. | 260/653.8 |
| 2,739,989 | 3/1956 | Earringer et al. | 260/653.8 |
| 2,989,571 | 6/1961 | Eisenlohr | 260/664 |
| 1,914,135 | 6/1933 | Lacy | 260/653.8 |
| 3,206,515 | 9/1965 | Olstowski et al. | 260/653.8 |

FOREIGN PATENTS OR APPLICATIONS

| | | | |
|---|---|---|---|
| 622,167 | 6/1963 | Belgium | 260/653.7 |
| 546,962 | 10/1957 | Canada | 260/653.7 |

*Primary Examiner*—Daniel D. Horwitz
*Attorney*—Stevens, Davis, Miller & Mosher

[57] ABSTRACT

Process for preparing chlorofluoromethanes by reaction of methane, chlorine and a recycle mixture of halogenated hydrocarbons, containing prevailingly carbon tetrachloride, with mineral calcium fluoride in a fluid bed at a temperature of from 450° to 600°C and for a contact time of from 0.5 to 120 seconds.

2 Claims, No Drawings

PROCESS FOR PREPARING HALOGENATED AND MIXED HALOGENATED DERIVATIVES OF METHANE BY THE CHLOROFLUORINATION OF METHANE

REFERENCE TO OTHER APPLICATIONS

This is a continuation-in-part of the copending application Ser. No. 608,705 filed Jan. 11, 1967 and now abandoned which in turn is a continuing application of Ser. No. 458,413 filed May 24, 1965 now abandoned.

BACKGROUND OF THE INVENTION

The present invention relates to a process for preparing chlorofluoromethanes and, more precisely, it relates to a process for preparing chlorofluoromethanes from methane, and employing calcium fluoride as the fluorine source.

Processes for preparing chlorofluoromethanes are known in the art; some of these comprise reacting hydrogen fluoride in vapor phase with a halogenated organic compound in the presence of catalytic systems usually based on the fluorides of aluminum, chromium, zirconium, thorium, and the like.

The above processes present the disadvantage of employing halogenated organic compounds such as carbon tetrachloride, chloroform, trichloroethylene, etc. as raw materials which in turn are obtained via the chlorination of hydrocarbons.

Another drawback accompanying said known processes is the employment of hydrogen fluoride as the fluorinating agent, which may itself be considered a valuable product inasmuch as it is generally obtained by treating calcium fluoride or its ores with sulfuric acid.

In order to obviate this last inconvenience an improved process has been proposed according to which a halogenated compound is reacted with calcium fluoride to effect partial substitution of the halogen atoms with fluorine atoms.

Nevertheless, this process also requires the use of halogenated hydrocarbons as starting materials.

According to another process, which is the object of our copending application Ser. No. 536,596 filed Mar. 21, 1966, now U.S. Pat. No. 3,442,962, fluorinated organic compounds, and particularly chlorofluorinated compounds, can be prepared by reacting hydrogen fluoride, chlorine, methane and one or more halogenated hydrocarbons in the presence of catalysts.

Such a process, although affording high reaction rates and high yields of useful products, exhibits the disadvantage of employing hydrogen fluoride as the fluorine source.

A process is also known for preparing halogenated organic derivatives of hydrocarbons by reacting $CH_4$, $SO_3$, $CaCl_2$ and $CaF_2$ with metal halides. Use of $SO_3$ according to this process involves the drawbacks of causing corrosion and affording insufficient yields.

According to another known process, chlorinated and brominated hydrocarbons can be fluorinated by employing sodium fluorosilicate as the fluorinating agent. In this process, however, fluorinated silicon compounds, e.g. $SiF_4$, are formed which require particular techniques in order to remove or recover them.

It is an object of the present invention to provide a process for preparing chlorofluoromethanes which display broad industrial application as freezing liquids, as liquid propellents for aerosols or as organic intermediates.

Another object is to provide a process for preparing chlorofluoromethanes, wherein methane is employed as the main starting material, and mineral calcium fluoride or a mixture thereof as the fluorine source.

Still another object is to provide a process which affords high conversions of starting materials and high yields of useful products.

The present invention distinguishes itself by an almost total conversion of fluorinating agent, remarkably higher than the conversion hitherto attainable according to known processes based upon the reaction of halogenated compounds with fluorinating agents containing calcium fluoride.

Another object is to provide a process for the chlorofluorination of hydrocarbons which is susceptible to thermal checks and allows high reaction rates to be attained.

Another object is to obtain chlorofluoromethanes which were hitherto obtained either by starting from chlorinated organic compounds or by employing hydrogen fluoride as the fluorinating agent.

THE INVENTION

According to the present invention, a gaseous mixture containing methane, chlorine and a recycle mixture of halogenated hydrocarbons is allowed to react with mineral calcium fluoride in the solid state or a mixture e.g.

To carry out the process of the present invention mineral calcium fluoride or one of the calcium fluoride ores, e.g. fluorite, can be employed.

The technique employed in order to contact the gaseous mixture of methane, chlorine with the calcium fluoride and the recycle mixture of halogenated hydrocarbons involves a fluid bed.

In dependence thereon, the size of the mineral calcium fluoride particles or of the mixture containing same can widely vary.

However the reaction is preferably conducted with mineral calcium fluoride of a size between 9 and 325 mesh (Tyler Standard Scale).

A calcium fluoride particularly suited therefore may be prepared according to the process set forth in our U.S. Pat. No. 3,372,126, and according to which the calcium fluoride is transformed into a form suitable for conducting the reaction in a fluid bed by drying in a spray dryer a finely ground mineral calcium fluoride suspension in an aqueous solution containing calcium chloride and, optionally HCl. When obtained in this manner the particles of fluorinating agent containing calcium fluoride have a substantially spheroidal shape, a granulometry variable within a broad range and are excellent for fluid bed applications.

Molar ratios between chlorine and methane can be varied over a broad range depending on whether it is desired to influence the reaction towards the more or the less halogenated products. It is preferably conducted with a molar ratio of chlorine/methane within the range of between 3.9 and 4,5.

Contact time (the ratio between the fluorinating agent volume, measured by reading the volume occupied by same when admitted to the reactor or a glass graduated cylinder, and the volume of reaction gases fed into the reaction zone per second: c.t. = fluorinating agent vol./ gas vol./sec.) of the gaseous mixture of reactants with the mineral calcium fluoride can vary over a wide range.

It has been ascertained that, within the fixed range, the longer the contact time, the greater the degree of fluorination of the final products.

Accordingly, the contact time is largely dependent on the nature of the products desired to be obtained. Nevertheless, a contact time of from 0,5 to 120 seconds, according to the present invention, is considered enough for the chlorofluorination reaction.

According to the present invention the temperature whereat the process is carried out is from between 450° and 600°C.

According to the present invention, the methane chlorofluorination reaction is conducted in the presence of a recycle mixture of halogenated hydrocarbons according to the technology set forth in our copending application, Ser. No. 536,596 filed Mar. 3, 1966.

According to the present invention the recycle mixture of halogenated hydrocarbons which is continuously recycled from the product side of the reaction zone to the reactant side contains as a main component carbon tetrachloride however some amounts of other products such as, e.g. chlorinated and chlorofluorinated derivatives of methane, tetrachloroethylene, hexachloroethane, perchlorobutadiene, hexachlorobenzene, may also be present. It may be generally stated however that the composition of the recycled halogenated hydrocarbon mixture determines the composition of the mixture on the product side of the reaction zone and, as a result, the predominant product, thereby allowing distribution of the main products to be varied by for example, modifying the molar ratio of the several halogenated hydrocarbons forming the recycled mixture. It may further be stated that, according to the present invention, as long as the desired conversion of the non-halogenated methane is maintained on the product side with the desired prevailing product, then the composition of the recycle mixture will remain unchanged. Thus, the recycle mixture, which occurs preferably in large amounts in comparison with the quantity of methane, works as a temperature controlling or heat dissipating agent as well as a product controlling medium.

The herein used term "halogenated hydrocarbons" refers to the hydrocarbons having at least one atom of chlorine or fluorine.

It has been found, however, that satisfactory results are attained when the recycle mixture contains from 60 to 100 percent by weight of carbon tetrachloride. The following additional halogenated hydrocarbons may also occur in the recycle mixture, although they will generally constitute less than a major portion of the recycled component: $CHCl_3$, $CH_2Cl_2$, $CFCl_3$, $CHCl_2F$, $CH_3Cl$, $CHF_3$, $CF_2Cl_2$, $CF_3Cl$, $CHF_2Cl$, $C_2Cl_6$, $C_2Cl_4$, $C_6Cl_6$ and perchlorobutadiene.

According to the present invention the preferred weight composition of the recycle mixture is within the range of from 60 to 100 percent of $CCl_4$, from 0 to 27 percent of $C_2Cl_4$, from 0 to 26 percent of $CFCl_3$; the total amount of the other halogenated hydrocarbons being not more than 8 percent of the whole recycle mixture.

In carrying out the reaction, it has been found particularly advantageous to combine the recycle mixture first with molecular chlorine and then with the methane employed as the starting material, however, this succession of combining the various components is not imperative.

The amount of recycle mixture of halogenated hydrocarbons, referring to the methane, can vary over a wide range.

There appears to be no upper limit for the molar ratio between recycle mixture and methane, except, from an economic standpoint.

Thus, it is desirable that the molar ratio be kept under the limit of substantially 15:1; in fact, with higher ratios no appreciable improvement occurs in the orientation of the reaction in regards the desired end products, while the necessity occurs for larger plant capacity for processing the greater amount of gases, in addition to other obvious drawbacks.

On the other hand when molar ratios between recycle mixture and methane lower than 3 are used the degree of conversion of calcium fluoride which can be reached is too low to be considered satisfactory.

The methane chlorofluorination reaction is exothermic and consequently, there must be provided means for the removal of the released heat, which can be effected by conventional methods such by simple cooling the outside of the reaction apparatus with steam or other suitable conventional means.

The recycle mixture of halogenated hydrocarbons serves the purpose of dissipating a portion of the reaction heat while at the same time helping to thermoregulate the entire process.

To illustrate further the present invention and the advantages thereof, the following specific examples are given, it being understood that these are merely intended to be illustrative and not limitative.

EXAMPLE 1

310 grams spheroidal fluorinating agent (prepared according to the process set forth in our U.S. Pat. No. 3,372,125 by drying a suspension of 280 grams calcium fluoride in aqueous solution containing 30 grams calcium chloride) are conveyed to a reactor at temperature of 470°C. Through the calcium fluoride fluid bed a gaseous mixture is allowed to flow, which mixture is composed of methane, chlorine, a mixture of recycled halogenated hydrocarbons and in the following molar ratios:

| | |
|---|---|
| methane | 1 |
| chlorine | 4 |
| Mixture of recycle halogenated hydrocarbons | 3.2 |

The compositions of the recycle mixture of halogenated hydrocarbons is as follows:

| | |
|---|---|
| $CCl_4$ | 66.1 % by weight |
| $CHCl_3$ | 2.5 % by weight |
| $CH_2Cl_2$ | 0.2 % by weight |
| $CCl_3F$ | 25.7 % by weight |
| $CCl_2F_2$ | 0.1 % by weight |
| $C_2Cl_4$ | 4.9 % by weight |
| $C_2Cl_6$ | 0.1 % by weight |
| High-boiling | 0.1 % by weight |

Contact time is 2 seconds.

Linear rate of gases whereby a good fluidification of the fluid bed is attained is 7.1 cm/sec.

At the reactor outlet the reaction products are fed to a stripping tower at the bottom of which the recycle mixture is collected and again conveyed to the reactor. From the tower top the products are extracted, washed first with water, then with diluted alkaline solutions, and then analyzed by gas chromatography.

The following conversions were attained:

| | |
|---|---|
| Methane | 99% |
| Chlorine | 98% |

The products obtained and the yields calculated on the converted methane were:

| | |
|---|---|
| CO | 0.6% |
| $CF_2Cl_2$ | 47.5% |
| $CHFCl_2$ | 0.2% |
| $CFCl_3$ | 51.7% |

Results and operative conditions are compiled in Table I.

EXAMPLE 2

The fluorinating agent is made up of a mixture of 600 grams of 97 percent by weight $CaF_2$ and 1.3 percent by weight $CaCl_2$ having a particle size of between 43 and 325 mesh, prepared by spray-drying a slurry of the following composition: fluorite 52 percent, diluted aqueous solution HCl 48 percent.

The reaction conditions are the same as those of Example 1. Results and operative conditions are reported in Table I.

EXAMPLE 3

This is conducted with 500 ml fluorinating agent prepared by spray drying a slurry composed as follows: $H_2O$ 40%, $CaCl_2$ 5%, $CaF_2$ 55%.

The fluorinating agent had the following characteristics: $CaF_2$ 91%, $CaCl_2$ 9%. Surface area: 9.2 m²/g. Volume of pores 0.28 ml/g.

Reaction conditions are the same as those of Example 1. Test duration: 90 minutes. Results and operative conditions are reported in Table I.

EXAMPLE 4

630 ml spheroidal fluorinating agent are employed, prepared by spray-drying, with an atomizing device of the two fluid nozzle type, a slurry constituted of 3,500 ml of an aqueous solution containing g 175 hydrochloric acid and g 3,500 fluorite of size lesser than 44 μ.

Fluorite composition is as follows: $CaF_2 = 97\%$, $CaCl_2 = 1.2\%$, $SiO_2 = 1\%$, $M_2O_3 = 0.5\%$ (wherein M = Fe, Al etc.).

Reaction is carried out by feeding in the reactor $CH_4$—$Cl_2$—$CCl_4$ in vapor phase.

At reactor outlet the products are washed with water, then with an alkaline aqueous solution and finally analyzed by gas-chromatographic way. Test duration: 130 hours. Results and operative conditions are reported in Table I.

EXAMPLE 5

600 ml fluorinating agent prepared in conformity with Example 4 are employed. Reaction conditions: as in Example 1. Test duration: 200 minutes.

Results and operative conditions are reported in Table I.

EXAMPLE 6

600 ml fluorinating agent is employed, which contains 97.5% $CaF_2$ and 1.2% $CaCl_2$ and is prepared by spray-drying a suspension containing: fluorite: 50%, aqueous solution containing 5% HCl: 50%. The reaction conditions are the same as those of Example 1. Test duration: 60 minutes.

Results and operative conditions are reported in Table I.

EXAMPLE 7

600 ml fluorinating agent like the one of Example 6 is employed.

The reaction conditions are the same as those of Example 1. Test duration: 150 minutes.

Results and operative conditions are reported in Table I.

EXAMPLE 8

743 g of a fluorinating agent of a particle size 60–325 mesh is employed, which contains 97% $CaF_2$ and 3% $CaCl_2$ and is prepared by spray-drying a suspension containing: flourite 50 percent, hydrochloric acid 1.5 percent, water 48.5 percent. The reaction conditions are the same as those of Example 1. Test duration 15,5 hours. Results and operative conditions are reported in Table I.

EXAMPLE 9

713 g of the same fluorinating agent used in Example 8 were used. The reaction was carried out as in Example 1 except that a pressure of 4 absolute atm was employed. Test duration 6 hours.

Results and operative conditions are reported in Table I.

EXAMPLE 10

255.5 g of a fluorinating agent of particle size 32–60 mesh is employed which contains 97% $CaF_2$ and 3% $CaCl_2$ and is prepared by spray-drying a suspension containing: fluorite 50 percent, hydrochloric acid 1.5 percent, water 48.5 percent.

The reaction conditions are the same as those of Example 1. Test duration 14 hours. Results and operative conditions are reported in Table I.

What is claimed is:

1. A process for the preparation of chlorofluoromethanes comprising reacting a gaseous mixture of methane, chlorine and a recycle mixture of halogenated hydrocarbons, consisting from 60 to 100 percent by weight of carbon tetrachloride and the balance consisting of halogenated hydrocarbons selected from $CHCl_3$, $CH_2Cl_2$, $CFCl_3$, $CHCl_2F$, $CH_3Cl$, $CHF_3$, $CF_2Cl_2$, $CF_3Cl$, $CHF_2Cl$, $C_2Cl_6$, $C_2Cl_4$, $C_6Cl_6$ and perchlorobutadine with a solid fluorinating agent arranged in a fluid bed and consisting essentially of mineral calcium fluoride for a contact time in the range of from 0.5 to 120 seconds, at a temperature of from 450° to 600°C, the molar ratio between chlorine and methane being in the range of from 3.9 to 4.5 and the molar ratio between recycle mixture of halogenated hydrocarbons and methane being in the range of from 3 to 150.

2. A process according to claim 1 wherein the recycle mixture contains from 60 to 100 percent by weight of carbon tetrachloride from 0 to 27 percent of $C_2Cl_4$ from 0 to 26 percent of $CFCl_3$; the total amount of the other halogenated hydrocarbons being not more than 8 percent of the whole recycle mixture.